United States Patent
Hwang et al.

(10) Patent No.: US 7,643,566 B2
(45) Date of Patent: Jan. 5, 2010

(54) APPARATUS AND METHOD FOR ESTIMATING FREQUENCY OFFSET IN ORTHOGONAL FREQUENCY DIVISION MULTIPLEXING SYSTEM

(75) Inventors: Jong-Yoon Hwang, Yongin-si (KR); Kwang-Soon Kim, Seoul (KR); Keum-Chan Whang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 11/401,484

(22) Filed: Apr. 11, 2006

(65) Prior Publication Data

US 2006/0239368 A1    Oct. 26, 2006

(30) Foreign Application Priority Data

Apr. 11, 2005    (KR) .................. 10-2005-0029986

(51) Int. Cl.
*H04K 1/10*    (2006.01)
(52) U.S. Cl. .................. 375/260; 375/344; 375/341; 375/345; 375/346; 375/316
(58) Field of Classification Search .................. 375/344, 375/341, 345, 346, 316, 260
See application file for complete search history.

(56) References Cited

U.S. PATENT DOCUMENTS

| | | | | |
|---|---|---|---|---|
| 6,269,132 | B1 * | 7/2001 | Yonge, III | 375/346 |
| 7,257,168 | B2 * | 8/2007 | Goldstein et al. | 375/316 |
| 2002/0186799 | A1 * | 12/2002 | Sayeed | 375/345 |
| 2003/0142764 | A1 * | 7/2003 | Keevill et al. | 375/341 |
| 2006/0153317 | A1 * | 7/2006 | Zhang et al. | 375/344 |
| 2009/0028258 | A1 * | 1/2009 | Ma et al. | 375/260 |

* cited by examiner

*Primary Examiner*—Sudhanshu C Pathak
(74) *Attorney, Agent, or Firm*—Roylance, Abrams, Berdo & Goodman, LLP

(57) ABSTRACT

An apparatus and method for estimating a frequency offset in an Orthogonal Frequency Division Multiplexing (OFDM) system are provided. Two time domain signals are generated from one received OFDM symbol through two observation windows with different delay times. The two time domain signals are compensated for a candidate frequency offset. A discrete Fourier transform process and a phase compensation process in a frequency domain are performed. A difference between two frequency domain signals compensated for a phase difference is computed with respect to each candidate frequency offset. For all candidate frequency offsets, difference values are compared with each other. A candidate frequency offset mapped to a minimum difference value is detected as an optimal frequency offset. The frequency offset can be more exactly estimated without consuming a bandwidth and increasing hardware complexity of a receiver.

20 Claims, 10 Drawing Sheets

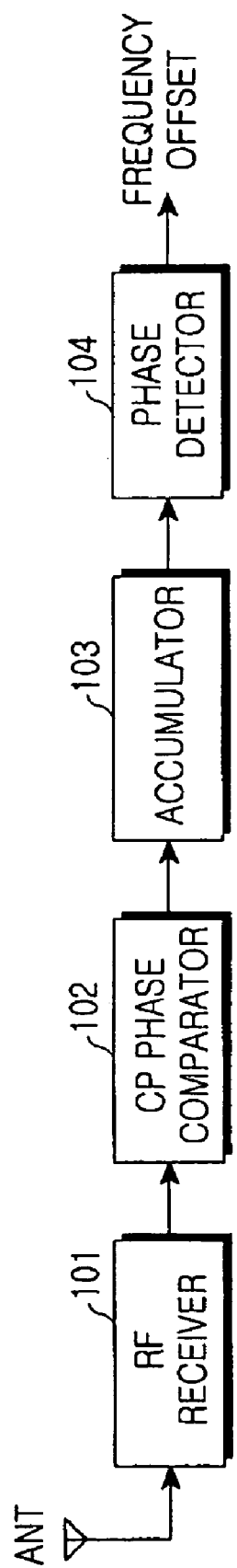
FIG.1
(CONVENTIONAL)

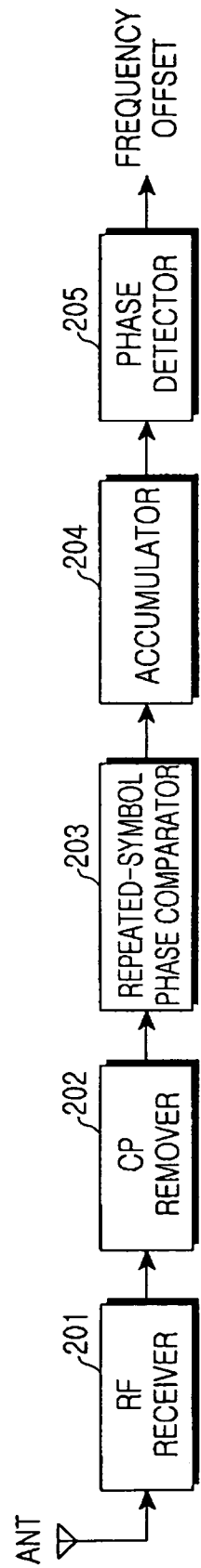
FIG.2
(CONVENTIONAL)

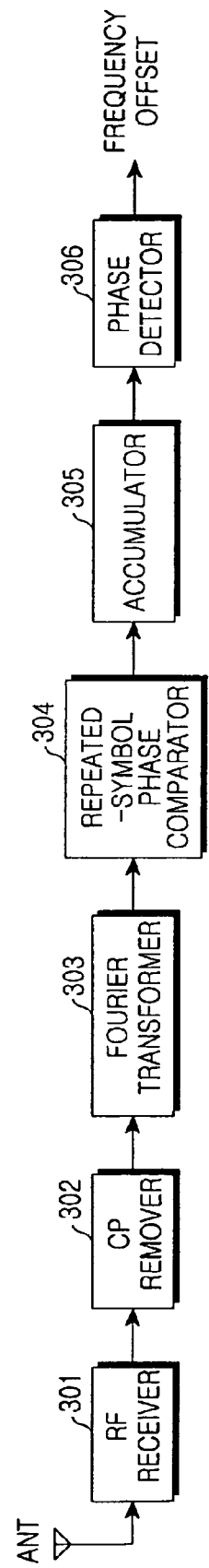
FIG.3
(CONVENTIONAL)

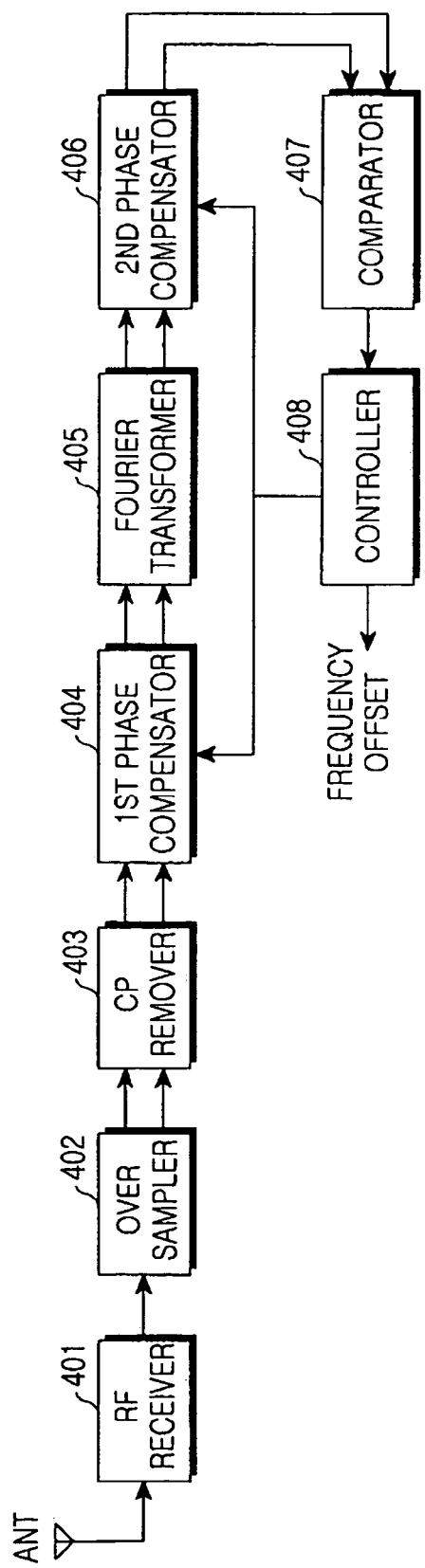
FIG.4
(CONVENTIONAL)

APPARATUS AND METHOD FOR ESTIMATING FREQUENCY OFFSET IN ORTHOGONAL FREQUENCY DIVISION MULTIPLEXING SYSTEM

CROSS-REFERENCE TO RELATED PATENT APPLICATION

This application claims the benefit under 35 U.S.C. § 119(a) of a Korean Patent Application Serial No. 2005-29986 filed in the Korean Intellectual Property Office on Apr. 11, 2005, the contents of which are hereby incorporated by reference.

BACKGROUND OF THE INVENTION

1. Field of the Invention

The present invention relates to an apparatus and method for estimating a frequency offset in an Orthogonal Frequency Division Multiplexing (OFDM) system.

2. Description of the Related Art

Because Orthogonal Frequency Division Multiplexing (OFDM) supports transmission throughput and use efficiency of a high frequency band, it is one of multiplexing systems currently being widely used. The OFDM system is very sensitive to synchronization errors. Specifically, the OFDM system may not maintain orthogonality between subcarriers when a frequency offset is present and therefore system performance is severely degraded. For this reason, many methods have been proposed to estimate the frequency offset.

The following methods observe phase variations in a symbol and estimate a frequency offset. The first method computes a correlation using characteristics of a pattern in which a Cyclic Prefix (CP) is equal to a particular part of a transmitted symbol and estimates a frequency offset in the time axis. The second method computes a phase difference by comparing phases of two half parts of one OFDM symbol in which the first half part is repeatedly transmitted in the second half part, and estimates a frequency offset. The third method transforms two repeated OFDM signals to frequency domain signals, observes a phase difference between the two frequency domain OFDM signals, and estimates a frequency offset. The fourth method transforms, to frequency domain signals, two signals obtained by sampling one OFDM symbol at a double clock frequency of a system bandwidth, computes a phase difference by comparing phases of the two frequency domain signals, and estimates a frequency offset.

Next, the above-described frequency offset estimation methods will be described in more detail.

FIG. 1 is a schematic block diagram illustrating a conventional frequency offset estimator in an OFDM system that estimates a frequency offset using the CP in the time axis.

Referring to FIG. 1, a Radio Frequency (RF) receiver 101 converts an RF signal received through an antenna (ANT) to a baseband frequency signal according to a frequency down-conversion process. A CP phase comparator 102 computes a phase difference by comparing phases of a CP and transmitted data with the same pattern as the CP in the received signal output from the RF receiver 101. An accumulator 103 accumulates and averages outputs of the phase comparator 102. A phase detector 104 detects a phase from an output signal of the accumulator 103, and computes and outputs a frequency offset. After the frequency offset output from the phase detector 104 is synchronized with a system clock, it is used to control the RF receiver 101 and so on.

The above-described method using a CP correlation may be efficient in the case where a system channel is ideal, that is, in the case of Additive White Gaussian Noise (AWGN). However, this method severely degrades performance when a signal-to-noise ratio increase due to Inter Symbol Interference (ISI) of a CP caused by a delay of a front symbol in a frequency selective fading channel in which the system actually operates.

FIG. 2 is a schematic block diagram illustrating another conventional frequency offset estimator in the OFDM system that transmits one OFDM symbol in two repeated half symbols, computes a phase difference by comparing phases thereof, and estimates a frequency offset.

Referring to FIG. 2, an RF receiver 201 converts an RF signal received through an antenna (ANT) to a baseband frequency signal according to a frequency down-conversion process. A CP remover 202 removes a CP from the received signal output by the RF receiver 201, extracts only transmitted data, and outputs the extracted data to a repeated-symbol phase comparator 203. The repeated-symbol phase comparator 203 computes a phase difference by comparing half symbols repeated in one OFDM symbol and outputs the computed phase difference to an accumulator 204. The accumulator 204 accumulates and averages outputs of the repeated-symbol phase comparator 203. A phase detector 205 detects a phase from an output signal of the accumulator 204, and computes and outputs a frequency offset. After the frequency offset output from the phase detector 205 is synchronized with a system clock, it is used to control the RF receiver 201 and so on.

There is advantageous that the method using two repeated half symbols as described above has less ISI than the CP correlation method. However, system throughput can be degraded because the same data is repeatedly transmitted.

FIG. 3 is a schematic block diagram illustrating another conventional frequency offset estimator in the OFDM system that observes frequency domain signals of two repeatedly transmitted OFDM symbols, computes a phase difference by comparing phases thereof, and estimates a frequency offset.

Referring to FIG. 3, an RF receiver 301 converts an RF signal received through an antenna (ANT) to a baseband frequency signal according to a frequency down-conversion process. A CP remover 302 removes a CP from the received signal output from the RF receiver 301, extracts only transmitted data, and outputs two OFDM symbols to a Fourier transformer 303. The Fourier transformer 303 transforms time domain OFDM signals to frequency domain OFDM signals, and outputs the frequency domain OFDM symbols to a repeated-symbol phase comparator 304. The repeated-symbol phase comparator 304 computes a phase difference by comparing phases of the two repeated frequency domain OFDM symbols, and outputs the computed phase difference to an accumulator 305. The accumulator 305 accumulates and averages outputs of the repeated-symbol phase comparator 304. A phase detector 306 detects a phase from an output signal of the accumulator 305, and computes and outputs a frequency offset. After the frequency offset output from the phase detector 306 is synchronized with a system clock, it is used to control the RF receiver 301 and so on.

When the above-described method repeatedly transmits two OFDM symbols, computes a phase difference in the frequency domain by comparing phases of the symbols, and estimates a frequency offset from the computed phase difference, system throughput is degraded because the same data is repeatedly transmitted.

FIG. 4 is a schematic block diagram illustrating yet another conventional frequency offset estimator in the OFDM system that generates two received signals by oversampling one OFDM symbol at a double system clock, computes a phase difference by comparing phases of the two received signals, and estimates a frequency offset.

Referring to FIG. 4, an RF receiver 401 converts an RF signal received through an antenna (ANT) to a baseband frequency signal according to a frequency down-conversion process. An oversampler 402 oversamples the received signal output from the RF receiver 401 and generates two received signals constructed by an on-time sample and a delayed sample. A CP remover 403 removes CPs from the two received signals based on oversampling, extracts only transmitted data, and outputs the extracted transmitted data to a first phase compensator 404. The first phase compensator 404 compensates phases of the two received signals based on oversampling using a candidate frequency offset value selected by a controller 408. A Fourier transformer 405 transforms two time domain signals whose phases have been compensated to frequency domain signals according to a Fourier transform process, and outputs the frequency domain signals to a second phase compensator 406. The second phase compensator 406 compensates phases of the frequency domain signals using the candidate frequency offset value selected by the controller 408. A comparator 407 computes a difference between the two frequency domain signals whose phases have been compensated by the second phase compensator 406 using the candidate offset value. The controller 408 outputs a candidate frequency offset value in a search range to the first and second phase compensators 402 and 406, such that a repeat operation is performed. When a search is completed in the search range, the controller 408 outputs a frequency offset mapped to a minimum difference value as an actual frequency offset value. After the frequency offset output from the controller 408 is synchronized with a system clock, it is used to control the RF receiver 401 and so on.

When the above-described method oversamples a received signal, that is, one OFDM symbol, at a double system clock and computes a phase difference, a repeated pattern or pilot symbol is not required and therefore throughput is not degraded. However, because the above-described method requires an oversampling structure, hardware complexity of a receiving side increases.

Therefore, the conventional methods for estimating a frequency offset in an OFDM system are disadvantageous in that a system bandwidth is consumed due to pilot transmission or repeated data pattern transmission or hardware complexity of a receiving side increases.

A need exists for an efficient frequency offset estimation apparatus and method having performance equal to or better than that of the conventional method without consuming a system bandwidth and increasing hardware complexity to estimate a frequency offset in an OFDM system.

SUMMARY OF THE INVENTION

The present invention provides a frequency offset estimation apparatus and method that can more precisely estimate a frequency offset without consuming a bandwidth and increasing hardware complexity of a receiver in an Orthogonal Frequency Division Multiplexing (OFDM) system.

In accordance with an exemplary aspect of the present invention, there is provided an apparatus for estimating a frequency offset in an Orthogonal Frequency Division Multiplexing (OFDM) system The apparatus comprises an observation-window setting unit for outputting two time domain signals with a predetermined delay time difference from a received signal through first and second observation windows with different delay times, a first compensator for compensating the two time domain signals using one candidate frequency offset among a plurality of preset candidate frequency offsets, a Fourier transformer for transforming the two compensated time domain signals to two frequency domain signals, a second compensator for compensating the frequency domain signal for the second observation window using the candidate frequency offset and compensating the compensated frequency domain signal for a phase difference based on the delay time difference, a comparator for comparing the frequency domain signal for the first observation window with the compensated frequency domain signal for the second observation window, and outputting a magnitude difference value, and a controller for controlling frequency compensations of the first and second compensators with the plurality of preset candidate frequency offsets, and estimating a candidate frequency offset mapped to a minimum difference value among difference values input from the comparator as an optimal frequency offset, the difference values being mapped to the plurality of preset candidate frequency offsets.

In accordance with another exemplary aspect of the present invention, there is provided a method for estimating a frequency offset in an Orthogonal Frequency Division Multiplexing (OFDM) system. The method comprises setting two time domain signals with a predetermined delay time difference from a received signal through first and second observation windows with different delay times, compensating the two time domain signals using one candidate frequency offset among a plurality of preset candidate frequency offsets, transforming the two compensated time domain signals to two frequency domain signals, compensating the frequency domain signal for the second observation window using the candidate frequency offset and compensating the compensated frequency domain signal for a phase difference based on the delay time difference, comparing the frequency domain signal for the first observation window with the compensated frequency domain signal for the second observation window, and computing a magnitude difference value, and repeating the steps with respect to all the plurality of preset candidate frequency offsets, and estimating a candidate frequency offset mapped to a minimum difference value among difference values computed for the plurality of preset candidate frequency offsets as an optimal frequency offset.

An exemplary implementation of the present invention generates two time domain signals from one received Orthogonal Frequency Division Multiplexing (OFDM) symbol through two observation windows with different delay times, compensates the two time domain signals for a candidate frequency offset, and performs a discrete Fourier transform process and a phase compensation process in a frequency domain. A difference between two frequency domain signals compensated for a phase difference is computed with respect to each candidate frequency offset. For all candidate frequency offsets, difference values are compared with each other. A candidate frequency offset mapped to a minimum difference value is detected as an optimal frequency offset.

According to an exemplary implementation of the present invention, terminal of an OFDM system can estimate a frequency offset without consuming a bandwidth corresponding to important resources of the system. An exemplary implementation of the present invention does not increase hardware complexity of a receiving side when the terminal estimates a frequency offset without a training stream. An exemplary implementation of the present invention can have higher performance than that of any conventional method and can smoothly estimate and control a frequency offset without requiring a training stream and increasing hardware complexity in the terminal. An exemplary implementation of the present invention can ensure the stability of the frequency offset estimation process by applying an average value of differences between observation windows for respective candidate frequency offsets.

BRIEF DESCRIPTION OF THE DRAWINGS

The above and other exemplary features, aspects, and advantages of the present invention will be more clearly understood from the following detailed description taken in conjunction with the accompanying drawings, in which like reference numerals will be understood to refer to like parts, components and structures, where:

FIG. 1 is a schematic block diagram illustrating a conventional frequency offset estimator in an Orthogonal Frequency Division Multiplexing (OFDM) system;

FIG. 2 is a schematic block diagram illustrating another conventional frequency offset estimator in the OFDM system;

FIG. 3 is a schematic block diagram illustrating another conventional frequency offset estimator in the OFDM system;

FIG. 4 is a schematic block diagram illustrating yet another conventional frequency offset estimator in the OFDM system;

DETAILED DESCRIPTION OF EXEMPLARY EMBODIMENTS

Certain exemplary embodiments of the present invention will be described in detail herein below with reference to the accompanying drawings.

Figure 5:
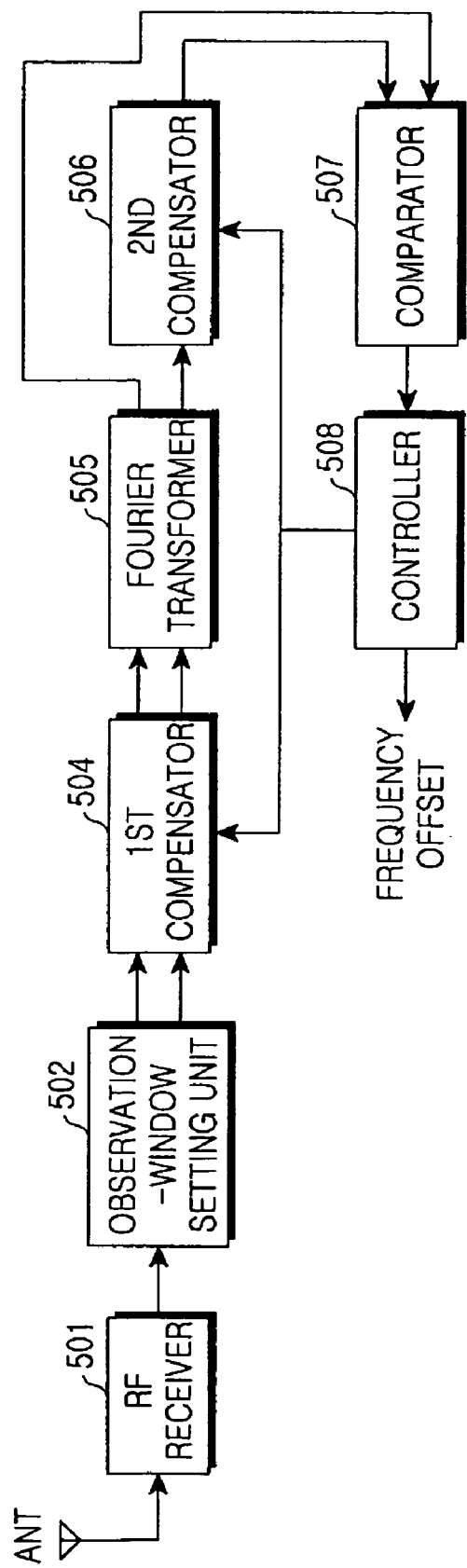
FIG. 5 is a schematic block diagram illustrating a frequency offset estimator in accordance with an exemplary embodiment of the present invention.

FIG. 5 is a schematic block diagram illustrating a frequency offset estimator in accordance with an exemplary embodiment of the present invention.

Referring to FIG. 5, the frequency offset estimator in accordance with the exemplary embodiment of the present invention is provided with a Radio Frequency (RF) receiver 501, an observation-window setting unit 502, a first compensator 504, a Fourier transformer 505, a second compensator 506, a comparator 507, and a controller 508.

The RF receiver 501 converts an RF signal received through an antenna (ANT) to a baseband frequency signal according to a frequency down-conversion process. The observation-window setting unit 502 receives the received signal including a Cyclic Prefix (CP) and a received Orthogonal Frequency Division Multiplexing (OFDM) symbol output from the RF receiver 501, and separates the received signal into two time domain signals with a predetermined delay time difference according to two preset observation windows. The first compensator 504 compensates the two time domain signals output from the observation-window setting unit 502 for a candidate frequency offset. The Fourier transformer 505 transforms the compensated time domain OFDM signals to frequency domain OFDM signals. The second compensator 506 compensates for a candidate frequency offset and a phase difference based on delay times of the two frequency domain signals. The comparator 507 computes and outputs a difference between the two frequency domain signals received from the Fourier transformer 505 and the second compensator 506. The controller 508 selects one of a plurality of preset candidate frequency offsets, sequentially provides the selected candidate frequency offset to the first and second compensators 504 and 506, checks a magnitude difference between the two frequency domain signals output from the comparator 507, and determines a candidate frequency offset mapped to a minimum magnitude difference as an optimal offset frequency.

One of the two observation windows with different delay times $\tau_1$ and $\tau_2$ includes at least part of the CP, and the two observation windows have the same length as the OFDM symbol except the CP, respectively. When the case of $\tau_1=0$ is excluded, all the observation windows include part of the CP.

Next, the operation of the frequency offset estimator with the above-described structure in accordance with the exemplary embodiment of the present invention will be described in more detail.

The observation-window setting unit 502 separates the received OFDM symbol output from the RF receiver 501 into two different time domain signals according to two preset observation windows, and outputs the two different time domain signals to the first compensator 504.

Figure 6:
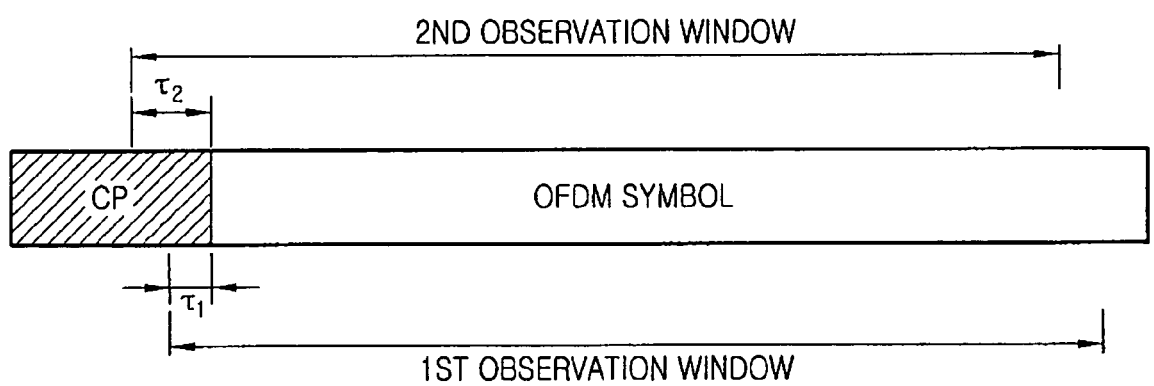
FIG. 6 illustrates two observation windows with different delay times in accordance with an exemplary embodiment of the present invention.

FIG. 6 illustrates two observation windows with different delay times $\tau_1$ and $\tau_2$.

Two time domain signals $y_i$ output from the observation-window setting unit 502 can be briefly expressed in the form of a matrix as shown in Equation (1).

$$y_i = e^{-j2\pi v \tau_i/N} \Gamma(v) W E(\tau_i) \tilde{x} + n_i, i=1,2, \quad \text{Equation (1)}$$

In Equation (1), N is the number of subcarriers, $\tau$ is a time error, and $v$ is a frequency offset. $E(\tau)$ $(=\text{diag}\{[\exp(-j2\pi\tau k/N)]_{k=0}^{N-1}\})$ represents a phase error of the received signal according to the time error $\tau$ of a receiver where k is a subcarrier index. $\Gamma(v)$ $(=\text{diag}\{[\exp(j2m\pi vm/N)]_{m=0}^{N-1}\})$ represents phase variation of the received time domain signal occurred due to the frequency offset $v$ where m is a discrete time variable.

When a data signal is x(k) and a channel response component is H(k), $\tilde{x}$ $(=([H(k)x(k)]_{k=0}^{N-1})^T)$ represents transmitted data with the channel response component. As shown in Equation (2), W is an N×N Inverse Discrete Fourier Transform (IDFT) matrix.

$$W = \frac{1}{\sqrt{N}} \begin{bmatrix} 1 & 1 & \cdots & 1 \\ 1 & e^{j2\pi\frac{1}{N}} & \cdots & e^{j2\pi\frac{(N-1)}{N}} \\ \vdots & \vdots & \ddots & \vdots \\ 1 & e^{j2\pi\frac{(N-1)}{N}} & \cdots & e^{j2\pi\frac{(N-1)(N-1)}{N}} \end{bmatrix} \quad \text{Equation (2)}$$

In the above-described equations, $[a(m)]_{m=0}^{N-1}$ is a 1×N vector in which an m-th element is a(m), and diag$\{[b(m)]_{m=0}^{N-1}\}$ is an N×N diagonal matrix in which an m-th diagonal element is b(m).

The first compensator 504 compensates the two time domain signals as shown in Equation (1) for a candidate frequency offset v', and then outputs the two compensated time domain signals to the Fourier transformer 505. The Fourier transformer 505 transforms the received signal observed in an interval of a first observation window according to a Fourier transform process, and obtains a frequency domain signal $Y_1$ as shown in Equation (3).

$$Y_1 = W^H \Gamma^H(v') y_1 + N_1 \quad \text{Equation (3)}$$

In Equation (3), $N_1(=W^H \Gamma_H(v')n_1)$ represents a frequency response of white noise for the first observation window.

In a similar manner, a frequency domain signal can be obtained through a Fourier transform process for a second observation window. Herein, a phase difference is present between the frequency domain signal $Y_1$ of the first observation window and a frequency domain signal $Y_2$ of the second observation window. This phase difference includes a phase variation component based on a time difference ($\tau_0 = \tau_2 - \tau_1$) between the first and second observation windows and a phase variation component due to a frequency offset of the received signal. That is, because a phase difference of $e^{-j2\pi v'\tau_0/N}$ and $E(\tau_0)$ are present between time domain signals $y_1$ and $y_2$, a phase difference between the frequency domain signals $Y_1$ and $Y_2$ has the same level as that between the time domain signals $y_1$ and $y_2$.

Equation (4) represents the frequency domain signal $Y_2$ obtained by compensating the phase of the frequency domain signal of the second observation window.

$$Y_2 = e^{j2\pi v'\tau_0/N} E^H(\tau_0) W^H \Gamma^H(v') y_2 + N_2 \quad \text{Equation (4)}$$

In Equation (4), $N_2(=e^{j2\pi v'\tau_0/N} E^H(\tau_0) W^H \Gamma^H(v')n_2)$ represents a frequency response of white noise for the second observation window where v' represents a candidate frequency offset. When an output signal of the second compensator 506 is observed, a white noise component is absent. When the candidate frequency offset v' is equal to an actual frequency offset v, the frequency domain signals of the first and second observation windows whose phases have been compensated must be equal to each other as shown in Equation (5).

$$Y_1 = Y_2, \text{ if } v = v' \text{ and } n_1 = n_2 = 0 \quad \text{Equation (5)}$$

Thus, an optimal frequency offset is obtained by searching for the candidate frequency offset v' that can minimize a difference between the frequency domain signal $Y_1$ of the first observation window and the frequency domain signal $Y_2$ of the second observation window. The candidate frequency offset v' for obtaining the optimal frequency offset is defined as shown in Equation (6).

$$\hat{v} = \arg\min_{v'}\{Y_1 - Y_2\}^H \{Y_1 - Y_2\} \quad \text{Equation (6)}$$

The comparator 507 and the controller 508 perform the operations as shown in Equation (6). That is, the comparator 507 computes a Euclidean distance difference between the frequency domain signals $Y_1$ and $Y_2$, and then outputs the computed Euclidean distance difference to the controller 508. The controller 508 checks a difference value output from the comparator 507, estimates a candidate frequency offset mapped to a minimum difference value as an optimal frequency offset, and updates the frequency offset. The controller 508 sequentially provides candidate frequency offsets in a frequency offset search range to the first and second compensators 504 and 506 such that a repeated operation is performed. In an exemplary implementation, the controller 508 sets a candidate frequency offset mapped to a minimum difference value to an optimal frequency offset and then outputs the optimal frequency offset when a search is completed in the search range. After the frequency offset output from the controller 508 is synchronized with a system clock, it is used to control the RF receiver 501 and so on.

The performance of the above-described frequency offset estimation method in accordance with an exemplary embodiment of the present invention can differ according to $\tau_0 (=\tau_2 - \tau_1)$ corresponding to a time axis interval between the first and second observation windows.

That is, the performance of the frequency offset estimator is improved as $\tau_0$ increases. The increased $\tau_0$ increases a phase variation level of a signal observed for frequency offset variation, and attenuates the sensitivity to noise in the estimator, such that noise-robust characteristics are provided. However, when $\tau_0$ increases excessively, Inter Symbol Interference (ISI) can occur due to a previous OFDM symbol. Therefore, a ($T_{CP} - \tau_2$) value is set to be more than a maximum delay value of a channel and a length of $\tau_0$ is set to a maximum value in a range in which performance degradation due to ISI is prevented, such that the performance of the estimator is maximized. Herein, $T_{CP}$ is a length of a CP set in the system.

FIG. 6 illustrates an operation for separating an OFDM symbol output from the RF receiver 501 into two different time domain signals according to observation windows preset in the observation-window setting unit 502 of FIG. 5.

As illustrated in FIG. 6, the observation-window setting unit 502 shifts one received OFDM symbol by preset times $\tau_1$ and $\tau_2$ in the time axis and then generates two time domain signals. These two time domain signals are expressed as shown in Equation (1).

Figure 7:
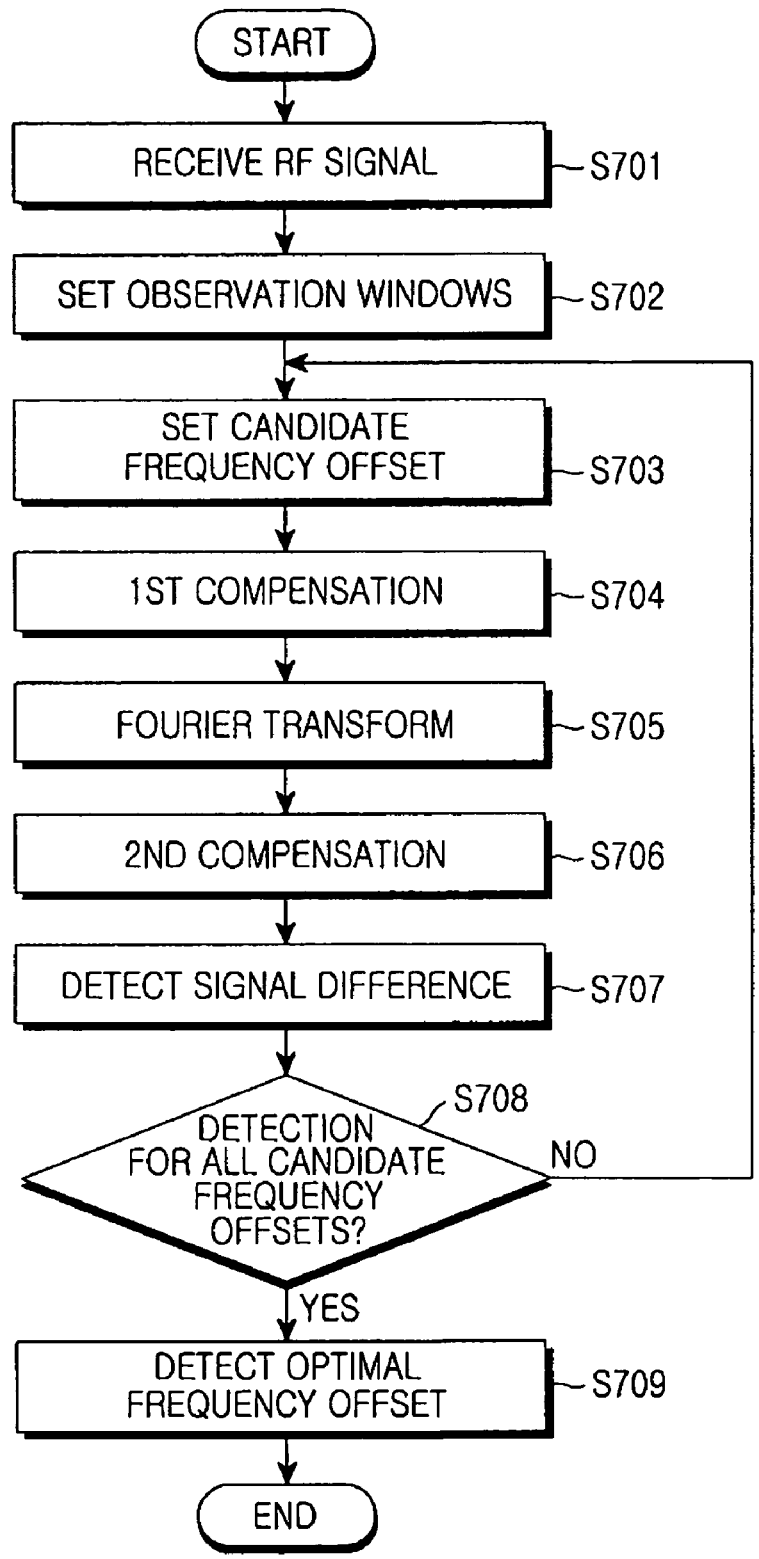
FIG. 7 is a flowchart illustrating a frequency offset estimation process in accordance with an exemplary embodiment of the present invention.

FIG. 7 is a flowchart illustrating a frequency offset estimation process in accordance with an exemplary embodiment of the present invention.

Referring to FIG. 7, the RF receiver receives an RF signal through an antenna and then converts the received signal to a baseband signal (Step S701). The observation-window setting unit sets observation windows (Step S702). That is, the observation-window setting unit separates a received OFDM symbol into two different time domain signals according to the set observation windows.

When the controller sets an arbitrary candidate frequency offset among a plurality of candidate frequency offsets (Step S703), the first compensator compensates the two time domain signals for the candidate frequency offset (Step S704). Subsequently, the Fourier transformer transforms the compensated time domain signals to frequency domain signals (Step S705). The second compensator compensates the frequency domain signals for a phase difference and the candidate frequency offset (Step S706).

The comparator computes a magnitude difference between the two frequency domain signals output from the second compensator (Step S707). Subsequently, the controller determines whether magnitude differences between frequency domain signals have been detected with respect to all the candidate frequency offsets (Step S708).

If magnitude differences between frequency domain signals have not been detected with respect to all the candidate frequency offsets, the controller provides a candidate frequency offset with the next sequence number to the first compensator, such that a process is repeated for frequency offset compensation in the time domain, Fourier transform, frequency offset compensation and phase compensation in the frequency domain, and magnitude difference detection between two frequency domain signals.

When this process has been repeated and the magnitude differences between frequency domain signals have been detected with respect to all the candidate frequency offsets, the controller compares the magnitude differences mapped to all the candidate frequency offsets, and sets a candidate frequency offset mapped to a minimum magnitude difference to an optimal frequency offset (Step S709).

In this exemplary embodiment of the present invention, a delay time $\tau_2$ of an observation window is fixed. In another exemplary embodiment of the present invention, different delay times $\tau_2$ are applied for candidate frequency offsets and an average value therebetween is applied, such that the stability of the frequency offset estimation process is improved.

Figure 8:
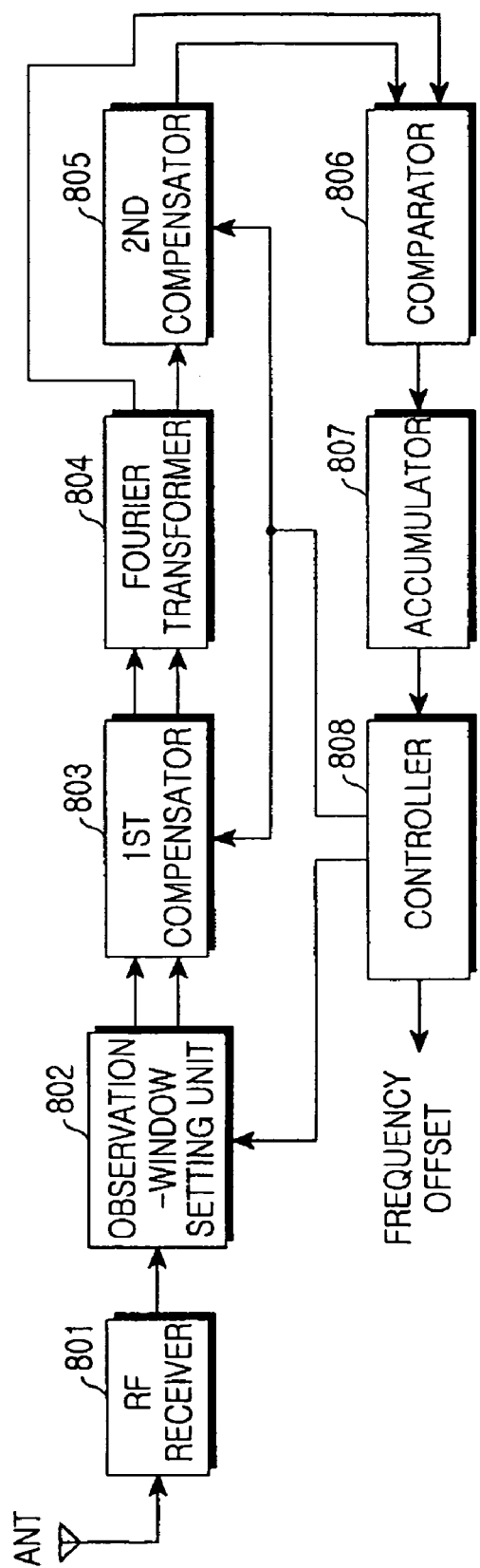
FIG. 8 is a schematic block diagram illustrating a frequency offset estimator in accordance with another exemplary embodiment of the present invention.

FIG. 8 is a schematic block diagram illustrating a frequency offset estimator in accordance with another exemplary embodiment of the present invention.

Referring to FIG. 8, the frequency offset estimator in accordance with the other embodiment of the present invention is provided with an RF receiver 801, an observation-window setting unit 802, a first compensator 803, a Fourier transformer 804, a second compensator 805, a comparator 806, an accumulator 807, and a controller 808.

The RF receiver 801 converts an RF signal received through an antenna (ANT) to a baseband frequency signal according to a frequency down-conversion process. The observation-window setting unit 802 receives the received signal including a CP and a received OFDM symbol output from the RF receiver 801, and separates the received signal into two time domain signals with a predetermined delay time difference according to two observation windows. The first compensator 803 compensates the two time domain signals output from the observation-window setting unit 802 for a candidate frequency offset. The Fourier transformer 804 transforms the compensated time domain signals to frequency domain signals. The second compensator 805 compensates for the candidate frequency offset and a phase difference based on the delay time difference between the two frequency domain signals. The comparator 806 computes and outputs a magnitude difference between the two frequency domain signals received from the second compensator 805. The accumulator 807 accumulates a magnitude difference between observation windows associated with each candidate frequency offset output from the comparator 806 and computes an average value. The controller 808 sequentially provides preset candidate frequency offsets to the first and second compensators 803 and 805. Moreover, the controller 808 sequentially provides a varied $\tau_2$ to the observation-window setting unit 802 such that a difference between observation windows can be obtained with respect to the preset candidate frequency offsets. In an exemplary implementation, the controller 808 checks a magnitude difference between frequency domain signals with respect to each candidate frequency offset as an average value provided from the accumulator 807, and estimates a candidate frequency offset mapped to a minimum difference to an optimal candidate frequency offset.

In this exemplary implementation, one of the two observation windows with different delay times $\tau_1$ and $\tau_2$ includes part of the CP, and the two observation windows have the same length as the OFDM symbol except the CP, respectively. When the case of $\tau_1=0$ is excluded, all the observation windows include part of the CP.

Next, an operation of an OFDM system receiver including the frequency offset estimator with the above-described structure in accordance with the other exemplary embodiment of the present invention will be described in more detail.

As described with reference to the exemplary embodiment of the present invention, a delay value between observation windows affects the performance of the frequency offset estimator. The performance of the proposed estimation method is equal to or better than that of the conventional estimation method even when an arbitrary delay value is selected. Information about a maximum delay value of a channel is useful to obtain an optimal performance of the estimator.

When information about the maximum delay value of the channel cannot be obtained in the receiver, another frequency offset estimation method can be defined as shown in Equation (7).

$$\hat{v} = \arg\min_{v'} \sum_{k=1}^{K} \{Y_1^{(0)} - Y_2^{(k)}\}^H \{Y_1^{(0)} - Y_2^{(k)}\} \quad \text{Equation (7)}$$

In Equation (7), $Y_1^{(0)}$ is a frequency domain signal based on a first observation window when $\tau_1=0$, and $Y_2^{(k)}$ is a frequency domain signal based on a second observation window when $\tau_2=k$. K is the receiver's design value that is set to be shorter than a value of a guard interval of the system (i.e., a length of a CP).

The observation-window setting unit 802 shifts one received OFDM symbol by delay values $\tau_1$ and $\tau_2$ of the observation windows selected in the controller 808 in the time axis, generates two time domain signals, and outputs the generated time domain signals to the first compensator 803. The first compensator 803 compensates the two time domain signals as shown in Equation (1) for a candidate frequency offset v' selected in the controller 808, and outputs the two compensated time domain signals to the Fourier transformer 804.

Because the operations of the Fourier transformer 804, the second compensator 805, and the comparator 806 are analogous to those of the Fourier transformer 505, the second compensator 506, and the comparator 507 of FIG. 5, their detailed description is omitted.

The accumulator 807 accumulates a magnitude difference between two frequency domain signals input from the comparator 806 with respect to each candidate frequency offset. That is, the accumulator 807 accumulates an output value of the comparator 806 whenever a delay value of the observation window is changed with respect to one candidate frequency offset.

The controller 808 varies the delay value $\tau_2$ of the observation window, output to the observation-window setting unit 802, preset K times as shown in Equation (7), and repeatedly computes a magnitude difference between two frequency domain signals K times, such that the accumulator 807 accumulates the repeatedly computed magnitude difference.

Whenever accumulative computation of all delay intervals is completed with respect to one candidate frequency offset, the controller 808 checks a value input from the accumulator 807, sets a candidate frequency offset mapped to a minimum value to an optimal frequency offset, and updates the frequency offset.

In an exemplary implementation, the controller 808 sequentially outputs candidate frequency offsets in a frequency offset search range to the first and second compensators 803 and 805, such that a repeated operation is performed.

When all searches are completed in the frequency offset search range, a candidate frequency offset mapped to a minimum difference value is selected and output as an optimal frequency offset value.

After the frequency offset output from the controller 808 is synchronized with a system clock, it is used to control the RF receiver 801 and so on.

Figure 9:
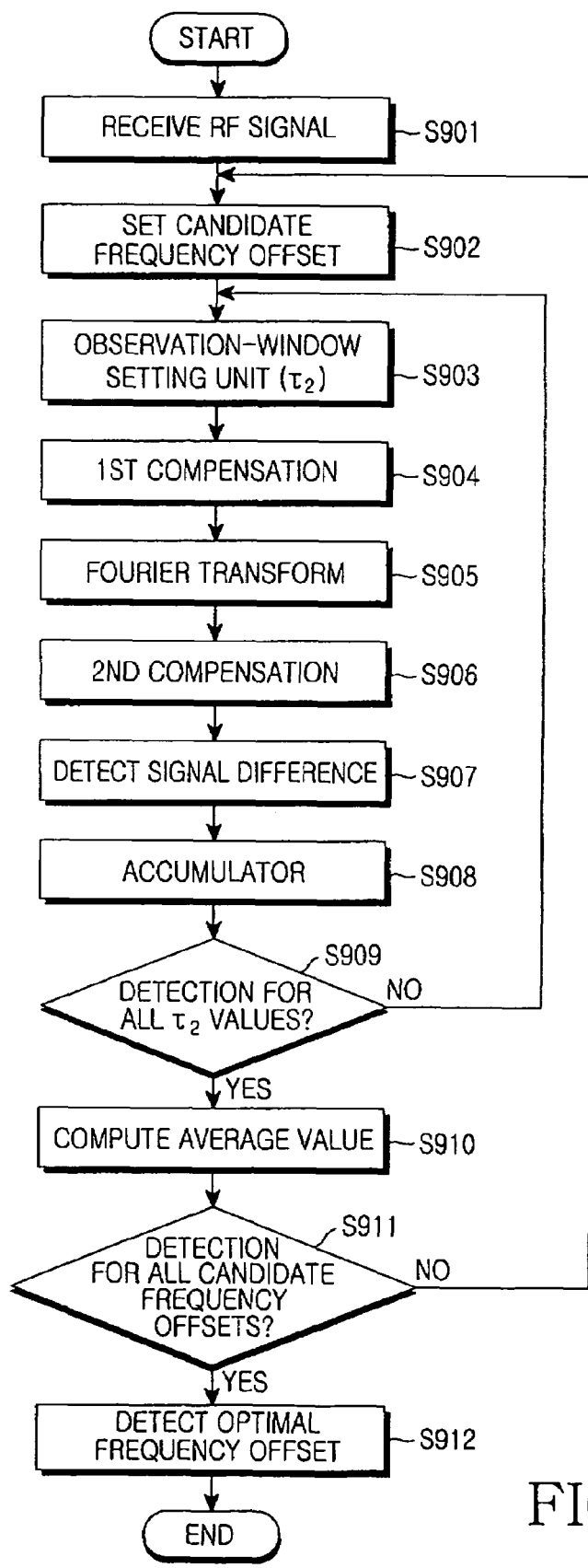
FIG. 9 is a flowchart illustrating a frequency offset estimation process in accordance with another exemplary embodiment of the present invention.

FIG. 9 is a flowchart illustrating a frequency offset estimation process in the frequency offset estimator with the structure of FIG. 8 in accordance with another exemplary embodiment of the present invention.

Referring to FIG. 9, the RF receiver receives an RF signal through an antenna and then converts the received signal to a baseband signal (Step S901). The controller sets an arbitrary candidate frequency offset among a plurality of set candidate frequency offsets (Step S902). The observation-window setting unit sets two observation windows with arbitrary delay times (Step S903). That is, the observation-window setting unit separates a received OFDM symbol into two different time domain signals according to the set observation windows.

The first compensator compensates the two time domain signals for the candidate frequency offset (Step S904). Subsequently, the Fourier transformer transforms the compensated OFDM signals to frequency domain OFDM signals (Step S905). The second compensator compensates the frequency domain OFDM signals for a phase difference and the candidate frequency offset (Step S906).

The comparator computes a magnitude difference between the two frequency domain signals output from the second compensator (Step S907). The accumulator accumulates a difference value (Step S908). A process of steps S903 to S908 is repeatedly performed to detect magnitude differences between frequency domain signals with respect to all $\tau_2$ values mapped to an associated candidate frequency offset.

When this process has been repeated and the magnitude differences between frequency domain signals have been detected with respect to all the $\tau_2$ values, an average value between the magnitude differences is computed with respect to all the $\tau_2$ values mapped to the associated candidate frequency offset (Step S910). Subsequently, the controller determines whether magnitude differences between frequency domain signals have been detected with respect to all the candidate frequency offsets (Step S911).

If magnitude differences between frequency domain signals have not been detected with respect to all the candidate frequency offsets, the controller provides a candidate frequency offset with the next sequence number to the first compensator, such that a process of the candidate frequency offset setting step (S902) to the average value computation step (S910) is performed repeatedly.

When this process has been repeated and the average values of the magnitude differences between frequency domain signals have been detected with respect to all the candidate frequency offsets, the controller compares the average values of the magnitude differences mapped to all the candidate frequency offsets, and detects a candidate frequency offset mapped to a minimum average value as an optimal frequency offset (Step S912).

Figure 10:
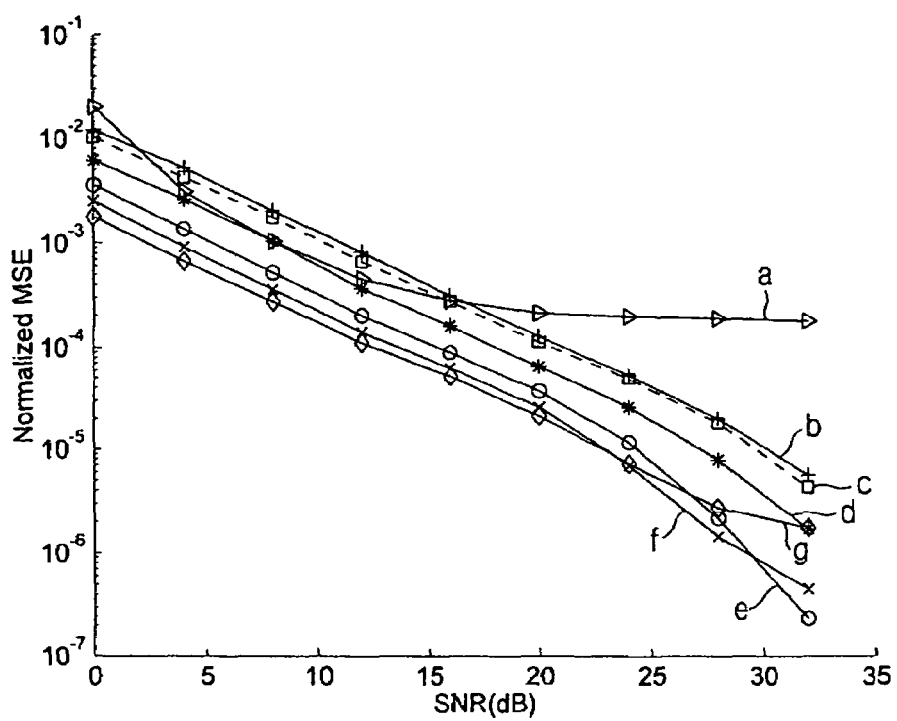
FIG. 10 is a graph illustrating performance comparison results between a conventional frequency offset estimator and a frequency offset estimator in accordance with an exemplary embodiment of the present invention.

FIG. 10 is a graph illustrating performance comparison results between a conventional frequency offset estimator and a frequency offset estimator in accordance with an exemplary embodiment of the present invention when a parameter is varied in a time-dispersion multipath channel.

In computer simulations representing graph characteristics of FIG. 10, the number of subcarriers is 64, the length of a guard interval (or CP) is 11 samples, a maximum delay value of a frequency selective multipath channel is 9 samples, and a power distribution profile uses 9 multipaths with characteristics of an exponential function. In the graph, the horizontal axis represents a Signal-to-Noise Ratio (SNR), and the vertical axis represents a normalized Mean Square Error (MSE) of an estimated frequency offset.

In FIG. 10, "a" indicates results in the conventional method using a CP correlation structure, and "c" indicates results in the conventional method using an oversampling structure.

In FIG. 10, "b", "d", "e", "f" and "g" indicate measurement results when $\tau_0=1$, $\tau_0=2$, $\tau_0=3$, $\tau_0=4$, and $\tau_0=5$ in accordance with the exemplary embodiment of the present invention, respectively.

As illustrated in FIG. 10, it can be seen that the method according to exemplary implementations of the present invention outperforms the conventional methods. Referring to results based on the prior art of FIG. 1 as indicated by "a", it can be seen that a CP is contaminated by ISI due to a previous symbol and therefore performance is severely degraded.

Referring to results based on the conventional method using the structure of FIG. 4 as indicated by "c", it can be seen that the conventional method has performance which may be somewhat similar to that of certain exemplary embodiments of the present invention when $\tau_0=1$ as indicated by "b". The conventional structure of FIG. 4 is more complex than that of certain exemplary embodiments of the present invention in terms of an oversampling hardware structure. In all cases except for the case where $\tau_0=1$ as indicated by "b", an exemplary implementation of the method of the present invention outperforms the conventional methods.

Figure 11:
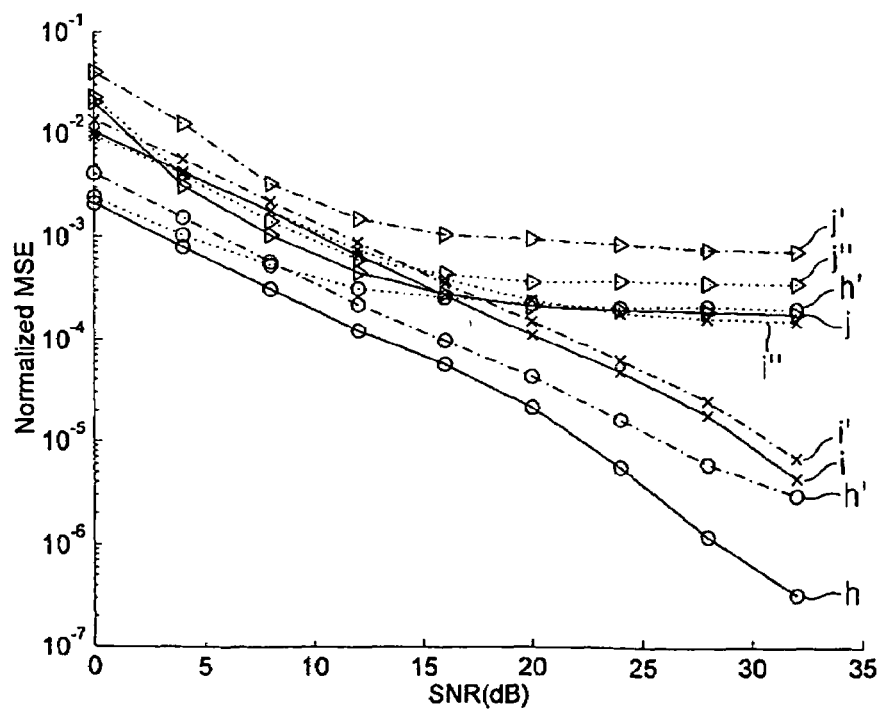
FIG. 11 is a graph illustrating performance comparison results between a conventional frequency offset estimator and a frequency offset estimator in accordance with another exemplary embodiment of the present invention.

FIG. 11 is a graph illustrating performance comparison results between a conventional frequency offset estimator and a frequency offset estimator in accordance with another exemplary embodiment of the present invention when a parameter is varied in three different time-dispersion multipath channels.

In a first channel (h,i,j) as indicated by the solid line, a maximum delay value is 9 and a power distribution profile of 9 multipaths is an exponential function. In a second channel (h',i',j') as indicated by the dash-dotted line, a maximum delay value is 9 and a power distribution profile of 9 multipaths has a uniform distribution. In a third channel (h",i",j") as indicated by the dotted line, a maximum delay value corresponds to 14 samples and a power distribution profile of a multipath is an exponential function. The third channel (h",i",j") corresponds to the case where a maximum delay value of a channel is more than a system guard interval value of 11 samples. In this case, it can be seen that received signals input to all the estimators through the third channel experience ISI due to adjacent symbols.

Herein, the power distribution profile is a uniform function in the second channel (h',i',j') and the power distribution profile is an exponential function in the first channel (h,i,j) and the third channel (h",i",j").

In Equation (7) representing the operation of the frequency offset estimator in accordance with an exemplary embodiment of the present invention, an accumulative interval K is set to 4.

From FIG. 11, it can be seen that the performance of the frequency offset estimation method in accordance with an exemplary embodiment of the present invention is equal to or more than that of the conventional method even though a received signal passes through any channel.

As described above, certain exemplary embodiments of the present invention can estimate a frequency offset without consuming a bandwidth by generating two time domain signals based on an OFDM system from one received symbol through observation windows with two different delay times, comparing accumulated difference values, and estimating an optimal frequency offset. According to an exemplary implementation, the present invention does not increase hardware complexity of a receiving side when a terminal estimates a frequency offset without a training stream. According to an exemplary implementation, the present invention can have higher performance than conventional methods and can smoothly perform frequency offset estimation and control operations without requiring a training stream and increasing hardware complexity in the terminal.

Exemplary implementations of the present invention can more efficiently estimate a frequency offset without reducing system throughput due to pilot symbol transmission or repeated data transmission.

Exemplary implementations of the present invention can estimate a frequency offset more exactly than any type of blind frequency offset estimation method of a conventional OFDM system without requiring any oversampling structure and increasing hardware complexity of a receiver.

While the present invention has been described with reference to certain exemplary embodiments thereof, the present invention is not limited to the above-described embodiments. Those skilled in the art will appreciate that various modifications, additions, and substitutions are possible, without departing from the scope of the present invention as defined by the appended claims and their equivalents.

What is claimed is:

1. An apparatus for estimating a frequency offset in an Orthogonal Frequency Division Multiplexing (OFDM) system, comprising:
   an observation-window setting unit for outputting at least two time domain signals comprising a delay time difference from a received signal through first and second observation windows with different delay times;
   a first compensator for compensating the two time domain signals using at least one candidate frequency offset of a plurality of candidate frequency offsets;
   a Fourier transformer for transforming the two compensated time domain signals to two frequency domain signals;
   a second compensator for compensating the frequency domain signal for the second observation window using the at least one candidate frequency offset and compensating the compensated frequency domain signal for a phase difference based on the delay time difference;
   a comparator for comparing the frequency domain signal for the first observation window with the compensated frequency domain signal for the second observation window, and outputting a magnitude difference value; and
   a controller for controlling frequency compensations of the first and second compensators with the plurality of candidate frequency offsets, and estimating a candidate frequency offset, mapped to a minimum difference value among difference values output from the comparator, as an optimal frequency offset;
   wherein the difference values are mapped to the plurality of candidate frequency offsets.

2. The apparatus of claim 1, wherein the controller selects one of the plurality of candidate frequency offsets until substantially all of the difference values between frequency domain signals are output, and repeatedly provides the selected candidate frequency offset to the first and second compensators.

3. The apparatus of claim 1, wherein the phase difference comprises a phase variation component due to a delay time difference between the first and second observation windows and a phase variation component of the received signal due to a frequency offset.

4. The apparatus of claim 1, wherein the difference value comprises a Euclidean distance difference between the two frequency domain signals.

5. The apparatus of claim 1, wherein the delay time difference comprises a value obtained by subtracting a delay time value of the second observation window from a delay time value of the first observation window, the first and second observation windows being set so that a value obtained by subtracting the delay time value of the second observation window from a time length of a guard interval value set in the system is set to be more than a maximum delay value of a channel.

6. The apparatus of claim 1, wherein the controller changes a delay time value of the second observation window a number of times, and wherein the apparatus further comprises:
   an accumulator for accumulating the difference value mapped to the selected candidate frequency offset output from the comparator and computing an average value between the accumulated difference values, when the delay time value is changed.

7. The apparatus of claim 6, wherein the controller selects one of the plurality of preset candidate frequency offsets until substantially all of the difference values between frequency domain signals are output, and repeatedly provides the selected candidate frequency offset to the first and second compensators.

8. The apparatus of claim 6, wherein the phase difference comprises a phase variation component due to a delay time difference between the first and second observation windows and a phase variation component of the received signal due to a frequency offset.

9. The apparatus of claim 6, wherein the difference value comprises a Euclidean distance difference between the two frequency domain signals.

10. A method for estimating a frequency offset in an Orthogonal Frequency Division Multiplexing (OFDM) system, comprising the steps of:
    setting at least two time domain signals with a delay time difference from a received signal through first and second observation windows with different delay times;
    compensating the at least two time domain signals using at least one candidate frequency offset of a plurality of candidate frequency offsets;
    transforming the two compensated time domain signals to two frequency domain signals;
    compensating the frequency domain signal for the second observation window using the candidate frequency offset and compensating the compensated frequency domain signal for a phase difference based on the delay time difference;
    comparing the frequency domain signal for the first observation window with the compensated frequency domain signal for the second observation window, and computing a magnitude difference value; and
    repeating the steps for substantially all of the plurality of candidate frequency offsets;
    wherein a candidate frequency offset mapped to a minimum difference value among difference values computed for the plurality of candidate frequency offsets is estimated as an optimal frequency offset.

11. The method of claim 10, wherein the phase difference comprises a phase variation component due to a delay time difference between the first and second observation windows and a phase variation component of the received signal due to a frequency offset.

12. The method of claim 10, wherein the difference value comprises a Euclidean distance difference between the two frequency domain signals.

13. The method of claim 10, wherein the delay time difference comprises a value obtained by subtracting a delay time value of the second observation window from a delay time value of the first observation window, the first and second observation windows being set so that a value obtained by subtracting the delay time value of the second observation window from a guard interval value set in the system is set to be more than a maximum delay value of a channel.

14. The method of claim 10, further comprising the steps of:
   before the step of setting the two time domain signals, changing a delay time value of the second observation window; and
   after the step of computing the difference value, accumulating the difference value, repeating the steps for changed delay time values, and computing an average value between accumulated difference values based on the delay time values.

15. The method of claim 14, wherein the phase difference comprises a phase variation component due to a delay time difference between the first and second observation windows and a phase variation component of the received signal due to a frequency offset.

16. The method of claim 14, wherein the difference value comprises a Euclidean distance difference between the two frequency domain signals.

17. The apparatus of claim 1, wherein the plurality of candidate frequency offsets comprises at least one preset candidate frequency offset.

18. The apparatus of claim 1, wherein the delay time difference comprises a predetermined delay time difference.

19. The method of claim 10, wherein the plurality of candidate frequency offsets comprises at least one preset candidate frequency offset.

20. The method of claim 10, wherein the delay time difference comprises a predetermined delay time difference.

* * * * *